(12) United States Patent
Fitzhugh et al.

(10) Patent No.: US 11,677,844 B2
(45) Date of Patent: *Jun. 13, 2023

(54) DELIVERY AND ACCELERATION WITH LOCALIZED SOURCE IP ADDRESSES WITHOUT RELIANCE ON CLIENT HEADERS

(71) Applicant: Akamai Technologies, Inc., Cambridge, MA (US)

(72) Inventors: Justin Kenneth Fitzhugh, Redwood City, CA (US); Peter Alan Blum, Portola Valley, CA (US); Girish Vaitheeswaran, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,692

(22) Filed: Mar. 2, 2021

(65) Prior Publication Data

US 2021/0185137 A1 Jun. 17, 2021

Related U.S. Application Data

(63) Continuation of application No. 15/724,963, filed on Oct. 4, 2017, now Pat. No. 10,938,925.

(60) Provisional application No. 62/405,136, filed on Oct. 6, 2016.

(51) Int. Cl.
*H04L 67/52* (2022.01)
*H04L 67/56* (2022.01)

(52) U.S. Cl.
CPC .............. *H04L 67/52* (2022.05); *H04L 67/56* (2022.05)

(58) Field of Classification Search
CPC ................................ H04L 67/52; H04L 67/56
USPC ......................................................... 709/219
See application file for complete search history.

*Primary Examiner* — Wing F Chan
*Assistant Examiner* — Leon Y Tseng
(74) *Attorney, Agent, or Firm* — David H. Judson

(57) ABSTRACT

A method of delivering location-specific content by a content processing server is disclosed. A request for web content is received by the content processing server. A location of an originator of the received request for web content is identified. A local proxy server is selected based on the identified location of the originator of the received request for web content. The web content is requested via the selected local proxy server. Location-specific web content from the content provider is received via the selected local proxy server. The received local-specific web content is sent to the originator of the received request in response to the received request.

5 Claims, 8 Drawing Sheets

DELIVERY AND ACCELERATION WITH LOCALIZED SOURCE IP ADDRESSES WITHOUT RELIANCE ON CLIENT HEADERS

CROSS REFERENCE TO OTHER APPLICATIONS

This application claims priority to U.S. Provisional Patent Application No. 62/405,136 entitled DELIVERY AND ACCELERATION WITH LOCALIZED SOURCE IP ADDRESSES WITHOUT RELIANCE ON CLIENT HEADERS filed Oct. 6, 2016 which is incorporated herein by reference for all purposes.

BACKGROUND OF THE INVENTION

Increasingly, content providers want to present media content that is geo-specific or location-specific. Geo-specific or location-specific content includes content that is relevant to the end-user's geographic location. By delivering location-specific content, content providers may provide content that is more relevant and appealing to the end-users, thereby attracting more visitors to their websites. In addition, content providers will be able to send geo-targeted advertisements that can generate higher user response rates. Therefore, improved techniques for delivering location-specific content from content providers to users are desirable.

BRIEF DESCRIPTION OF THE DRAWINGS

Various embodiments of the invention are disclosed in the following detailed description and the accompanying drawings.

DETAILED DESCRIPTION

Figure 1:
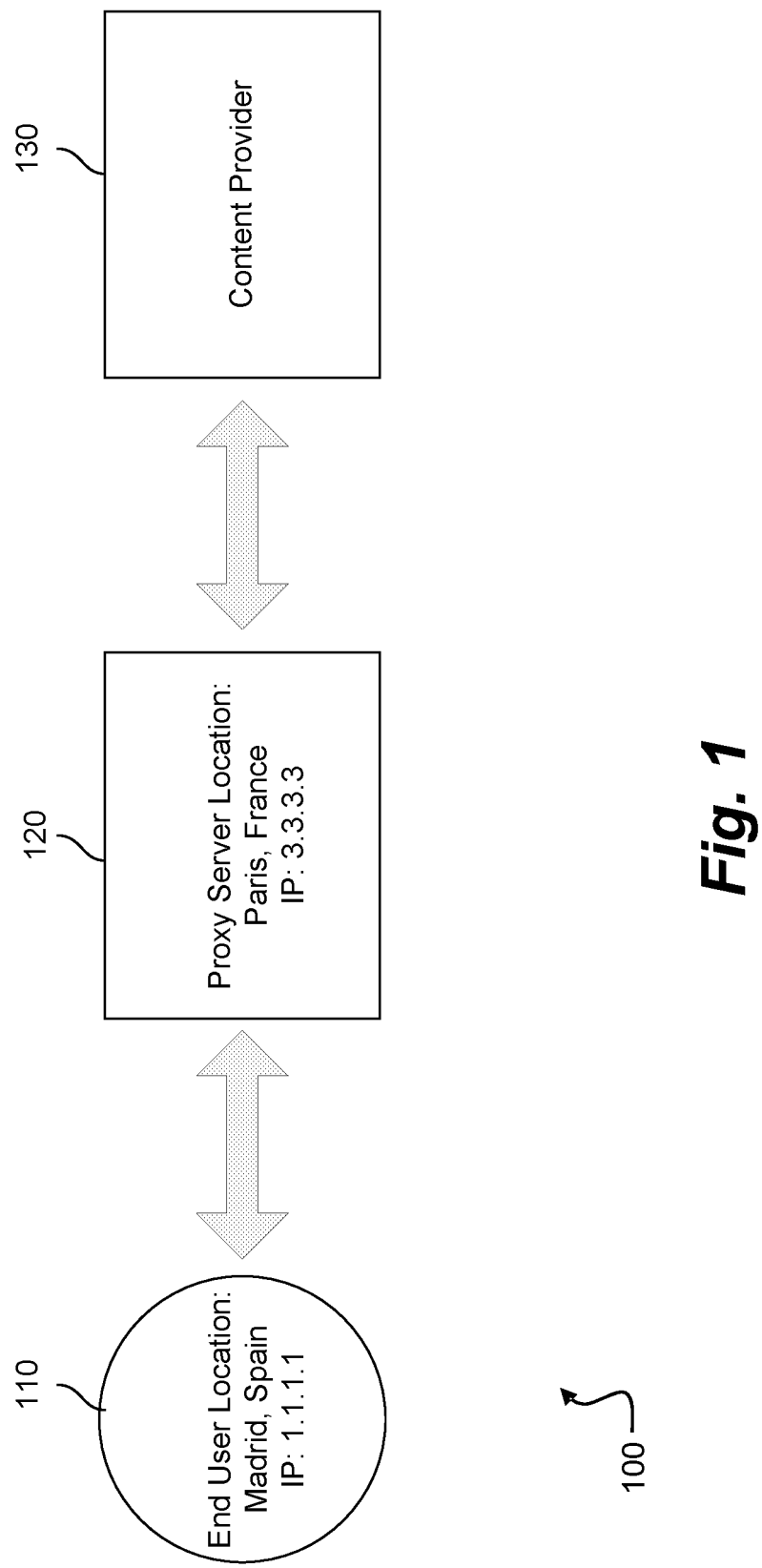
FIG. 1 is a diagram showing an example of a content provider serving location-specific content for a location corresponding to a proxy server in a proxy delivery network, as opposed to a location corresponding to the end-user's device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Increasingly, content providers want to present media content that is geo-specific or location-specific. Geo-specific or location-specific content includes content that is relevant to the end-user's geographic location. The location-specific content may be in any form, such as text, images, videos, audio clips, maps, and the like, and is related to a specific locality, such as a continent or region, country, state or province, city, zip-code, or neighborhood. Location-specific content may be in different languages. For example, content providers may want to serve content in a specific language based on the end-user's location, such as Spanish in Latin American countries and Mandarin Chinese in China, Hong Kong, or Taiwan. Location-specific content may be location-specific advertisements or media content that is integrated with location-specific advertisements. Many businesses market only to customers in a specific geographic area. For example, restaurants, hotels, and brick-and-mortar shops serve a local clientele. Therefore, advertisements integrated with the media content provided by a content provider may be customized based on the end-user's current location or surrounding locations. Location-specific content may also include information that corresponds to a specific geographic area only, including weather forecasts, event or calendar information, traffic or transportation information, and the like. By delivering location-specific content, content providers may provide content that is more relevant and appealing to the end-users, thereby attracting more visitors to their websites. In addition, content providers will be able to send geo-targeted advertisements that can generate higher user response rates. Therefore, improved techniques for delivering location-specific content from content providers to users are desirable.

In some techniques, a content provider may inspect the source IP (Internet Protocol) address of the end-user's device, map the source IP address to a geolocation, and then serve location-specific content to the end-user. A geolocation is the identification or estimation of the real-world geographic location of an object, such as a user's mobile phone or internet-connected computer terminal. An IP address is assigned to each device participating in a computer network that uses IP for communication. The IP protocol specifies that each IP packet must have a header which contains, among other things, the IP address of the sender of the packet. Therefore, when a content provider receives a request from an end-user's device requesting for web content, the content provider may extract the source IP address from the IP header. The extracted source IP address is then mapped to a geolocation by using a geolocation software or by looking up a geolocation database. However, this technique relies on the content provider receiving the request for the web content directly from the end-user device, which is a requirement that is frequently not met. This is because typically web content is delivered to the end-user device via a proxy delivery network, such as a content delivery network (CDN).

Delivering web content from a content provider via a proxy delivery network has many advantages. A proxy delivery network can distribute the load, save bandwidth, boost performance, and reduce cost. In addition, a proxy delivery network may be a proxy acceleration network that can provide additional enhancing features, such as HTML streaming, caching, and content integrity protection, as will be described in greater detail below. However, delivering location-specific content by a content provider to an end-user via a proxy delivery network also presents a number of difficulties.

One of the problems is that the content provider may see the source IP address of the proxy server of the proxy delivery network but not the source IP address of the end-user device originating the request for downloading content, and therefore the content provider may serve location-specific content for a location corresponding to the proxy server, as opposed to the location corresponding to the end-user's device.

A method of delivering location-specific content by a content processing server is disclosed. A request for web content is received by the content processing server. A location of an originator of the received request for web content is identified. A local proxy server is selected based on the identified location of the originator of the received request for web content. The web content is requested via the selected local proxy server. Location-specific web content from the content provider is received via the selected local proxy server. The received local-specific web content is sent to the originator of the received request in response to the received request.

In some embodiments, a source Internet Protocol (IP) address corresponding to the received request for web content is extracted, and the location of the originator of the received request for web content is identified based on the extracted source IP address corresponding to the received request for web content. In some embodiments, the received request for web content is received directly from the originator of the received request.

In some embodiments, selecting the local proxy server based on the identified location of the originator of the received request for web content further comprises determining that a location of the selected local proxy server shares location-specific web content served by the content provider with the identified location of the originator of the received request for web content.

FIG. 1 is a diagram showing an example of a content provider serving location-specific content for a location corresponding to a proxy server in a proxy delivery network, as opposed to a location corresponding to the end-user's device. As shown in FIG. 1, the location of an end-user's device 110 is Madrid, Spain, and its IP address is 1.1.1.1. When the end-user's device 110 sends a request to a content provider 130 requesting for web content to be downloaded to the end-user's device 110, the request is sent to content provider 130 via a proxy server 120. The proxy server 120 is located in Paris, France, and its IP address is 3.3.3.3. When content provider 130 receives the request for web content from proxy server 120, content provider 130 sees the source IP address of 3.3.3.3 corresponding to proxy server 120, but fails to see the source IP address of 1.1.1.1 corresponding to the end-user's device 110. Consequently, content provider 130 geolocates the end-user request to Paris, France based on the source IP address of 3.3.3.3 instead of geolocating the end user request to Madrid, Spain, had the content provider 130 been able to see the source IP address of 1.1.1.1. And as a result, content provider 130 serves content that is personalized for a French user despite the end-user being based in Madrid, Spain.

One solution to the problem as shown in FIG. 1 is to have the proxy server 120 forward the source IP address 1.1.1.1 of the end-user's device 110 to content provider 130 as metadata along with the request for the web content. However, due to security concerns, some content providers may choose to not rely on or trust the forwarded client header information because such information can be easily modified or forged when it is sent through a proxy delivery network.

In the present application, improved techniques (also referred to as the smart geolocation technique) of delivering location-specific content from a content provider via a proxy acceleration network are disclosed. The proxy acceleration network can distribute the load, save bandwidth, boost performance, and reduce cost. In addition, the proxy acceleration network can provide additional enhancing features, such as HTML streaming, caching, content integrity protection, and the like, in a cost-effective manner and at the same time deliver location-specific content from a content provider to an end-user without requiring the content provider to rely on or trust the forwarded end-user client header information, which can be easily modified or forged.

In the present application, enhancing techniques that may be provided by the proxy acceleration network are described first. Second, techniques of delivering location-specific content from a content provider to an end-user via the proxy acceleration network (smart geolocation technique) are disclosed.

One of the enhancing techniques that may be provided by the proxy acceleration network is content integrity protection. A web browser may comprise functionality that is configured to access and request resources embedded within a webpage to be rendered by the web browser. However, a content modifier such as a third-party add-on of the web browser may be configured to modify, substitute or block one or more particular types of resources associated with the webpage prior to rendering by the web browser. Such content modification functionality may typically utilize a range of techniques to modify the webpage. These techniques include (i) adding content to the webpage prior to rendering by the web browser; (ii) removing content from the webpage prior to rendering by the web browser; (iii) blocking retrieval of content by the web browser prior to rendering by the web browser; (iv) substituting content associated with the webpage prior to rendering by the web browser; and (v) modifying one or more display attributes associated with content prior to rendering by the web browser. Typically, these modifications are performed automatically as a background process and without the knowledge or explicit consent of a user of the web browser or a publisher of the web content. Moreover, these modifications may negatively impact the functionality and aesthetics of the content, thereby compromising the integrity of the webpage. The proxy acceleration network disclosed in the present application may provide content integrity protection such that a webpage provided by a content provider may not be modified by a third-party add-on of the web browser.

For example, integrity of web content is protected in a manner that reduces the likelihood the web content is altered prior to display to an end user. In some embodiments, an original content location address to be encoded is received. For example, the original content location address location is to be obfuscated to prevent content modifiers (e.g., content modifier/blocker provided by a third-party to modify/block content that was originally intended by an original publisher to be rendered to a user) from recognizing the original content location address as a location address to replace or block.

In some embodiments, a resource identifier (e.g., content location address) is intercepted and encoded/obfuscated during web program execution. For example, because resource identifiers specified in dynamically executed code of web content may be dynamically modified, extracted, or utilized during execution as a basis to build other identifiers, transformation of a resource identifier to an encoded form prior to execution of the dynamically executed code may result in execution errors. In another example, a dynamic resource identifier is dynamically generated during dynamic code execution and is not present in its complete form in the text of web content received at a web browser.

One way of achieving resource identifier interception is to override code utilized to access and set/modify resource identifiers during program code execution. For example, JavaScript code is utilized to access objects of object models that provide a standardized application programming interface (API) to access elements of a web document and a web browser.

The object models provide objects with one or more object properties that represent values, other associated objects, and/or function/methods of the associated object. For example, when an object property is invoked, it may return a value, another object, and/or call a function/method to enable a web program to access, modify, set, and/or otherwise affect a value or functionality of a web document and/or a web browser. In one example, a web program is able to modify contents to be rendered by calling one or more object properties of an object of a Document Object Model (DOM) API, browser object model API, and/or other web API. In another example, a web program is able to redirect to a browser to a new webpage by setting an object property (e.g., JavaScript ".location" object property of the standard web object model "window" object) to a new URL. When referring to program object properties throughout the specification, the preceding "." is included in the name of the object property. Another common way of referring to a program object property is without the preceding "." and a program object property identified with the preceding "." refers to the same object property that may be referred to by others without the preceding "." (e.g., ".location" property of the "window" object and the "location" property of the "window" object both refer to the same property of the "window" object).

Web object model program object properties are often utilized in contexts associated with resource identifiers. For example, program object properties can be invoked to modify, process or otherwise utilize a resource identifier (e.g., resource identifier provided as an argument of a call to set a value) or may return a resource identifier (e.g., resource identifier received for use by other web code). If an encoded resource identifier is to be utilized, an original resource identifier must be encoded before it is utilized in invoking the API implementation code of the web object model program object property. Additionally, if a web resource has been obtained using an encoded resource identifier, an invocation of the program object property to obtain the resource identifier may return the encoded resource identifier that needs to be translated back to a not encoded version prior to allowing the resource identifier to be utilized by the web program. For example, the web program may expect the original not encoded resource identifier and instead if an encoded version is received, it may cause an error in the web program. Thus it is desirable to be able to intercept an invocation of a web object model program object property and perform additional processing beyond the original API of the web object model program object property to appropriately encode or decode a resource identifier.

In order to intercept a resource identifier to be obfuscated, some standard web object model object property identifiers (e.g., standard web API object property identifiers) of properties of standard web object model objects may be reassigned to invoke inserted wrapper code that replace and in effect wrap corresponding standard web API implementation code. Conventionally, a standard web object model object property identifier (e.g., utilized in web program executed by a browser) of a property of a standard web object model object is assigned by default to reference and invoke standard API (e.g., DOM API) implementation code. According to embodiments described herein, the standard web object property identifier is reassigned to reference and invoke new replacement implementation code, and new code is added to encode or decode resource identifiers in addition to invoking the standard API implementation code (e.g., standard API JavaScript getter and setter methods of the property are replaced with a replacement JavaScript getter and setter methods that adds the new code). This in effect replaces particular memory address locations identifying code of a standard API method/functions with replacement memory address locations of replacement methods/functions. Although the standard web object model object property identifier is still utilized in web programs, the standard identifier has been remapped/reassigned to a replacement identifier that identifies the new inserted wrapper code where desired additional processing (e.g., intercept and perform identifier encoding/decoding) is able to be performed in addition to performing the desired standard web API processing (e.g., invoke the standard code of a corresponding web API). In this way, requests for resources are intercepted by the wrapper method/function to modify the requests (e.g., transform/encode resource location identifier (e.g., URL) of a request) in a manner that is transparent to other processes running within a web browser environment prior to invoking the standard API to process the request.

Embodiments have particular application in relation to certain standard web object model object property identifiers (e.g., ".location" property identifier) of properties of standard web object model objects (e.g., "window" object) that are prevented by a web browser from being reassigned to reference and invoke replacement code. Such standard web object model object properties, which implementation code/function/method is to be executed when its standard object property identifier is referenced in a web program, cannot be modified (e.g., reassignment will cause an error) due to limitations enforced by a web browser. In essence these properties of the standard web object model objects are configured to be not directly interceptable by setting the standard object property with not configurable and not writable JavaScript object property attributes. This prevents these standard web object model object property identifiers from being reassigned to reference and invoke replacement code to handle resource identifier interception. While it is the case that certain standard web object model object property identifiers of standard object properties can be reassigned to reference and invoke a different replacement code to redefine/replace the standard API JavaScript getter and setter methods of the standard object property with new code, the browser prevents redefinition/replacement of the getter and setter methods of standard object properties such as ".location" of a standard web API "window" object.

In some embodiments, one or more instances in program code that references an identifier of a web object model program object property that is prevented by a web browser from being reassigned are identified. For example, JavaScript code of a webpage is analyzed to identify uses of one or more selected program object property identifiers. The one or more identified instances in the program code are modified (e.g., replaced) with one or more corresponding replacement references that include a replacement identifier. The replacement reference is defined in the program code as being associated with a new program object property that invokes the web object model program object property in addition to performing additional processing (e.g., encoding or decoding of a resource identifier) associated with the invocation of the program object property. For example, because the replacement identifier has been utilized instead of the original identifier of the web object model program object property that was prevented by a web browser from being reassigned, the new program object property defined to perform additional processing (e.g., identifier encoding) is invoked in place of the original web object model program object property.

Certain embodiments described herein relate to controlling access to network resources. In particular, certain embodiments described herein provide techniques for protecting one or more portions of the content to prevent unauthorized modification by content modification functionality associated with the web browser, prior to retrieval of associated network resources. In this manner, rendering of the content may be controlled and the integrity of a webpage can be protected.

Figure 2:
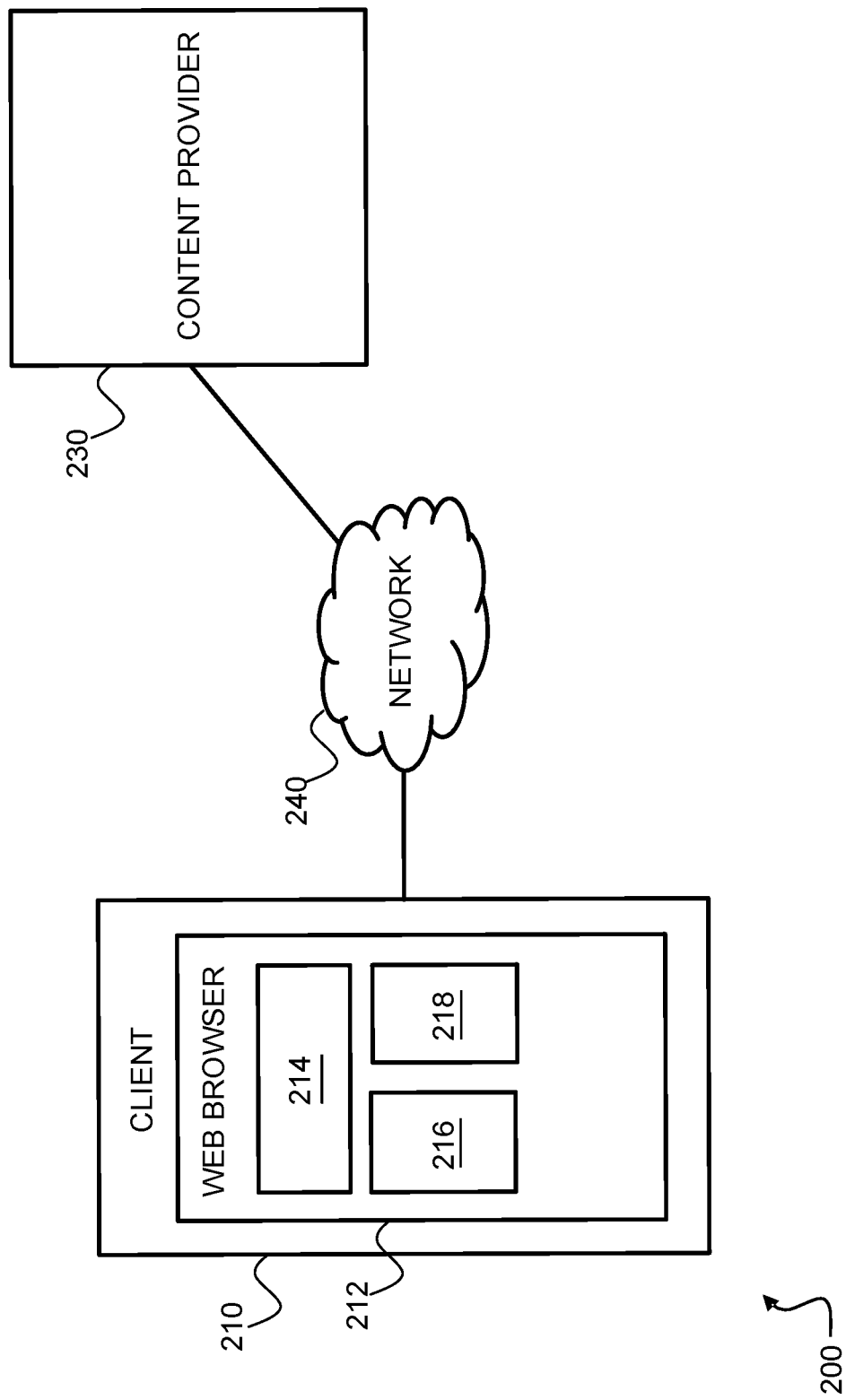
FIG. 2 is a schematic diagram showing an example of a system in accordance with an embodiment.

FIG. 2 is a schematic diagram showing an example of a system in accordance with an embodiment. The system 200 comprises a client device 210 and a content provider system 230, which are communicatively coupled through a network 240. The client device 210 is configured with a web browser 212 for retrieval and rendering of webpages from the content provider system 230. The client device 210 may comprise a laptop computer, a desktop computer, a tablet computer, a smartphone, or any other device capable of installing and running the web browser 212. The content provider system 230 may comprise a web server, such as an origin server or any other apparatus capable of serving webpages to the client device 210. The network 240 may comprise any combination of public or private networks, including intranets, local area networks (LANs), wide area networks (WANs), radio access networks (RANs), Wi-Fi networks and/or the Internet.

The web browser 212 is configured to receive a webpage definition 216 (e.g., web content) from the content provider system 230 for rendering and presentation of a corresponding webpage to a user of the client device 210. For example, the web browser 212 may retrieve the webpage definition 216 from the content provider system 230 by issuing one of more network requests according to the Hypertext Transfer Protocol (HTTP) (e.g., one or more GET requests) or any other suitable networking or Internet protocol. The webpage definition 216 may comprise a file formatted according to one or more mark-up languages, such as Hypertext Mark-up Language (HTML) and/or Extensible Mark-up Language (XML), etc. The webpage definition 216 may also comprise content in the form of dynamically executable code, defined in terms of one or more programming languages (e.g., JavaScript, JavaScript Object Notation (JSON), etc.), such as interpreted programming languages, scripting languages, managed programming languages, web programming languages, etc. The webpage definition 216 may also comprise content in the form of one or more display attributes, defined in a style sheet language such as the Cascading Style Sheets (CSS) language.

The webpage definition 216 may be associated with one or more resources to be obtained and/or rendered by the web browser 212. Examples of such resources include image files, script files, video files, audio files, Adobe Flash content, HTML5 content, other webpage files, and the like. Typically, the resources are stored in one or more repositories that are located remote from the client device 210 and are retrieved by the web browser 212 prior to rendering of the associated webpage, or portion thereof. The web browser 212 may locate and retrieve the one or more resources based on one or more respective resource identifiers associated with the webpage definition 216. Examples of a resource identifier include a Uniform Resource Identifier (URI), a Uniform Resource Locator (URL), a network path, a location address, a storage location and any other content identifier. The one or more resource identifiers may be included in the webpage definition 216 retrieved by the web browser 212 and/or generated dynamically in response to execution of executable code (e.g., JavaScript) included or referenced by the webpage definition 216.

Figure 3:
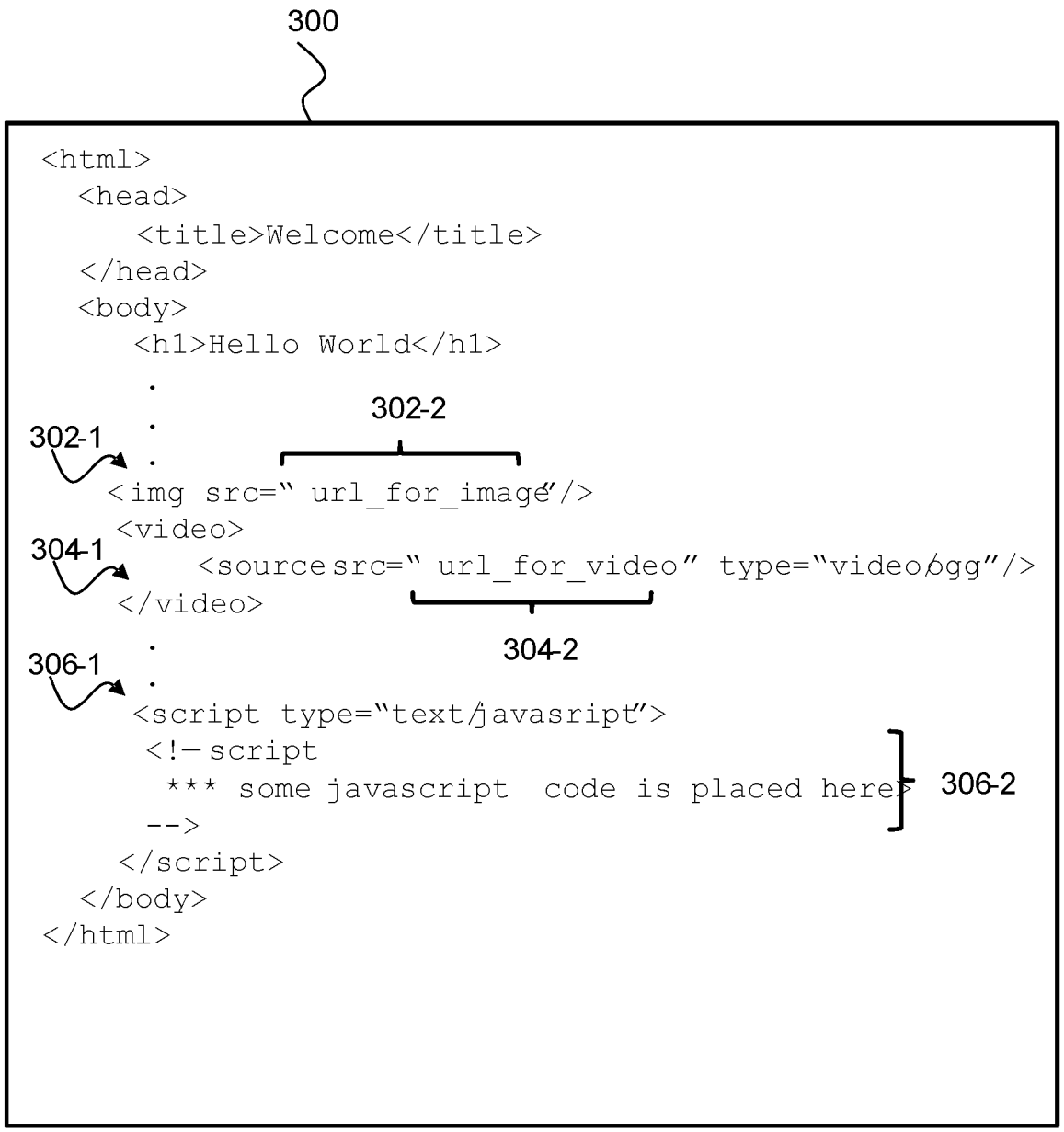
FIG. 3 shows an example of a webpage definition in the form of an HTML document.

FIG. 3 shows an example of a webpage definition in the form of an HTML document. The exemplary webpage definition 216 comprises an image element 302-1, an image resource identifier 302-2, a video element 304-1, a video resource identifier 304-2, a script element 306-1, and one or more executable instructions 306-2 associated with the script element 306-1.

Upon receipt, the web browser 212 parses the webpage definition 216 to build a data structure 218 representing the structure of the corresponding webpage in local memory associated with the web browser 212. For example, the data structure 218 may represent the webpage according to a Document Object Model (DOM).

In this respect, the DOM is a standardized model for representing the various components of a webpage and is supported by various web browsers, including Internet Explorer and Microsoft Edge, developed and maintained by Microsoft Corporation of Redmond, Wash., United States of America; Mozilla Firefox, developed and maintained by the Mozilla Foundation of Mountain View, Calif., USA; and Google Chrome, developed and maintained by Google Inc. of Mountain View, Calif., USA. The DOM is a cross-platform and language-independent convention for representing and interacting with objects in HTML documents, as well as XHTML and XML documents. The DOM represents a webpage in terms of one or more objects that are arranged according to a hierarchy of nodes which are organized according to a tree structure. The one or more objects may be addressed and manipulated using one or more methods and the public interface of a DOM is specified in its application programming interfaces (APIs). The DOM standard includes a plurality of levels. For example, DOM levels 0 and 1 are the core standards supported by the majority of web browsers, while DOM level 2 and above are extensions to DOM levels 0 and 1, which are to be optionally supported by web browsers. DOM levels 0 and 1 define a "core" set of objects and interfaces for accessing and manipulating document objects, and provide a complete model for representation of HTML documents, including the means to modify portions of the representation.

Figure 4:
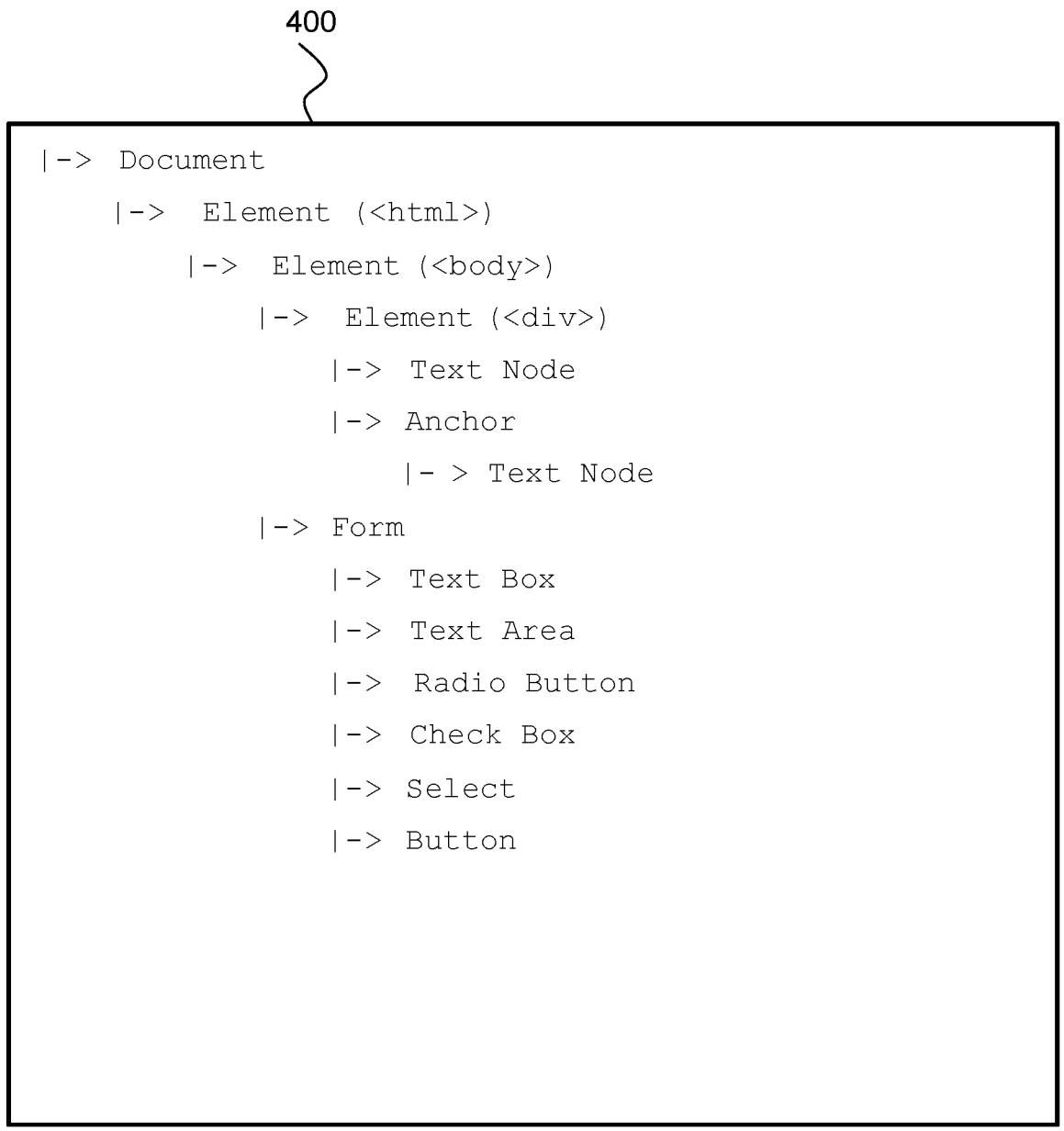
FIG. 4 is a schematic diagram showing an example of a DOM tree.

FIG. 4 is a schematic diagram showing an example of a DOM tree. As shown in FIG. 4, the topmost node, or root, of DOM tree 400 is the document object. A document object represents an entire HTML (or XML) document, and it provides the primary access to the document's data. An element within the document object, known as an element object, represents an element in the HTML document. Elements in the DOM tree 400 may include text, anchors, text-boxes, text areas, radio buttons, check boxes, selects, buttons, and the like.

With reference to the example shown in FIG. 3, when web browser 212 prepares to render webpage 300 on a screen, web browser 212 parses the received HTML webpage file and builds a DOM tree to represent the various components and resources of webpage 300 in a local memory. For example, when the image tag (shown as <img src="url for image"/> in FIG. 3) is parsed by web browser 212, the image is represented as an image object, and the image object is inserted into the DOM tree.

Once the webpage definition 216 has been parsed by the web browser 212, the web browser 212 builds/traverses the data structure 218 to identify any resources referenced by the data structure 218 for retrieval over the network 240. For example, where the data structure 218 takes the form of a DOM tree, the web browser 212 examines each node in the DOM to identify any resources for retrieval over the network 240. For example, a node in the DOM tree corresponding to the image tag 302-1 in the webpage definition 216 will include the associated image resource identifier 302-2, and a node in the DOM tree corresponding to the video tag 304-1 in the webpage definition 216 will include the associated video resource identifier 304-2. Accordingly, as a result of building/traversing the DOM tree, the web browser 212 will proceed to fetch the image identified by the image resource identifier 302-2 and the video identified by the video resource identifier 304-2 for rendering in the webpage. The web browser 212 therefore proceeds to issue separate network requests (e.g., HTTP GET requests) via the network 240 to fetch the image and video resources, based on the image resource identifier 302-2 and the video resource identifier 304-2 respectively. In other words, if the nodes of the DOM tree include N different resource identifiers, the web browser 212 may proceed to issue N separate resource requests (e.g., N separate HTTP GET requests) via the network 240 to request the associated resources, and in response the web browser 212 will receive N separate network responses (e.g., N separate HTTP GET responses), comprising the requested resources.

The webpage definition 216 may comprise or reference one or more dynamically executable instructions which are executed by the web browser 212 upon receipt. For example, when the webpage definition 216 takes the form of the HTML document 300 of FIG. 3, the web browser 212 may execute the one or more executable instructions 306-2 included in the script element 306-1. In some cases, the one of more executable instructions 306-2, when executed by the web browser 212, may reference or dynamically generate one or more resource identifiers associated with resources located remote from the web browser 212. In other words, the one or more executable code (e.g., JavaScript code) of a webpage definition may include or result in dynamic generation or modification of one of more resource identifiers (e.g., "dynamic resource identifiers").

The one of more executable instructions 306-2 may cause the web browser 212 to fetch a resource associated with such a dynamic resource identifier. For example, the one or more executable instructions 306-2 may cause the web browser 212 to issue a network request (e.g., an HTTP GET request) to fetch the associated resource. In this respect, the one of more executable instructions 306-2 may utilize AJAX (Asynchronous JavaScript and XML) techniques to cause the web browser 212 to issue a network request for a resource associated with the dynamic resource identifier. In particular, the one of more executable instructions 306-2 may include JavaScript code which uses the XMLHttpRequest application programming interface (API) or the jQuery library to request the resource associated with the dynamic resource identifier.

Returning to FIG. 2, as is known in the art, the web browser 212 may be configured with a third party content modification component 214.

Examples of content modification component 214 include a web browser plugin/extension, a third party program, a third party script, and any other third party program/code that is able to alter content of web browser 212. In an alternative embodiment, content modification component 214 is a standalone program/process separate from web browser 212. The content modification component 214 may be configured to take actions with respect to a particular resource associated with the webpage rendered by the web browser 212. For example, the content modification component 214 may be configured to prevent the web browser 212 from issuing a resource request associated with the particular resource, or to cause the web browser 212 to fetch a different or alternative resource in place of the particular resource.

Blocking mechanisms of content modification component 214 may be at least partly circumvented by transforming (e.g., encoding) resource identifiers/locators in the webpage definition 216 prior to delivery to the web browser 212. For example, the content provider system 230, or intermediary, in the network 240, may be configured to transform the one or more URIs/URLs in an HTML document to reduce the likelihood that the content modification component 214 will be able to identify the associated resources. In this manner, it is possible to reduce the likelihood that resources associated with the HTML document are blocked or modified by the content modification component 214 prior to rendering of the associated webpage. However, such countermeasures are only available with respect to static resource identifiers which are already present as static elements in web content (e.g., webpage definition 216) prior to receipt by the web browser (e.g., resource identifiers utilized in HTML elements that are not scripts) and are not applicable to dynamic resource identifiers which are utilized in dynamically executed code (e.g., utilized in JavaScript present or referenced in the webpage definition 216). For example, because resource identifiers specified in dynamically executed code may be dynamically modified, extracted or utilized as a basis to build other identifiers, transformation of a resource identifier to an encoded form prior to execution of the dynamically executed code may result in execution errors. In another example, a dynamic resource identifier is dynamically generated during dynamic code execution and is not present in its complete form in the text of web content received at a web browser.

In some embodiments, dynamic resource identifiers are specified or generated by dynamically executable script/code or application (e.g., code of JavaScript, other managed or interpreted programming language, etc.) while static resource identifiers are not specified by dynamically executable script/code or application (e.g., specified within non script HTML elements). Accordingly, in order to maintain the integrity of the webpage, alternative or additional countermeasures are required to prevent modification/blocking of resources associated with dynamic resource identifiers by the content modification component 214. Accordingly, certain embodiments described herein provide various techniques to prevent modification/blocking of resources by the content modification component 214.

Figure 5:
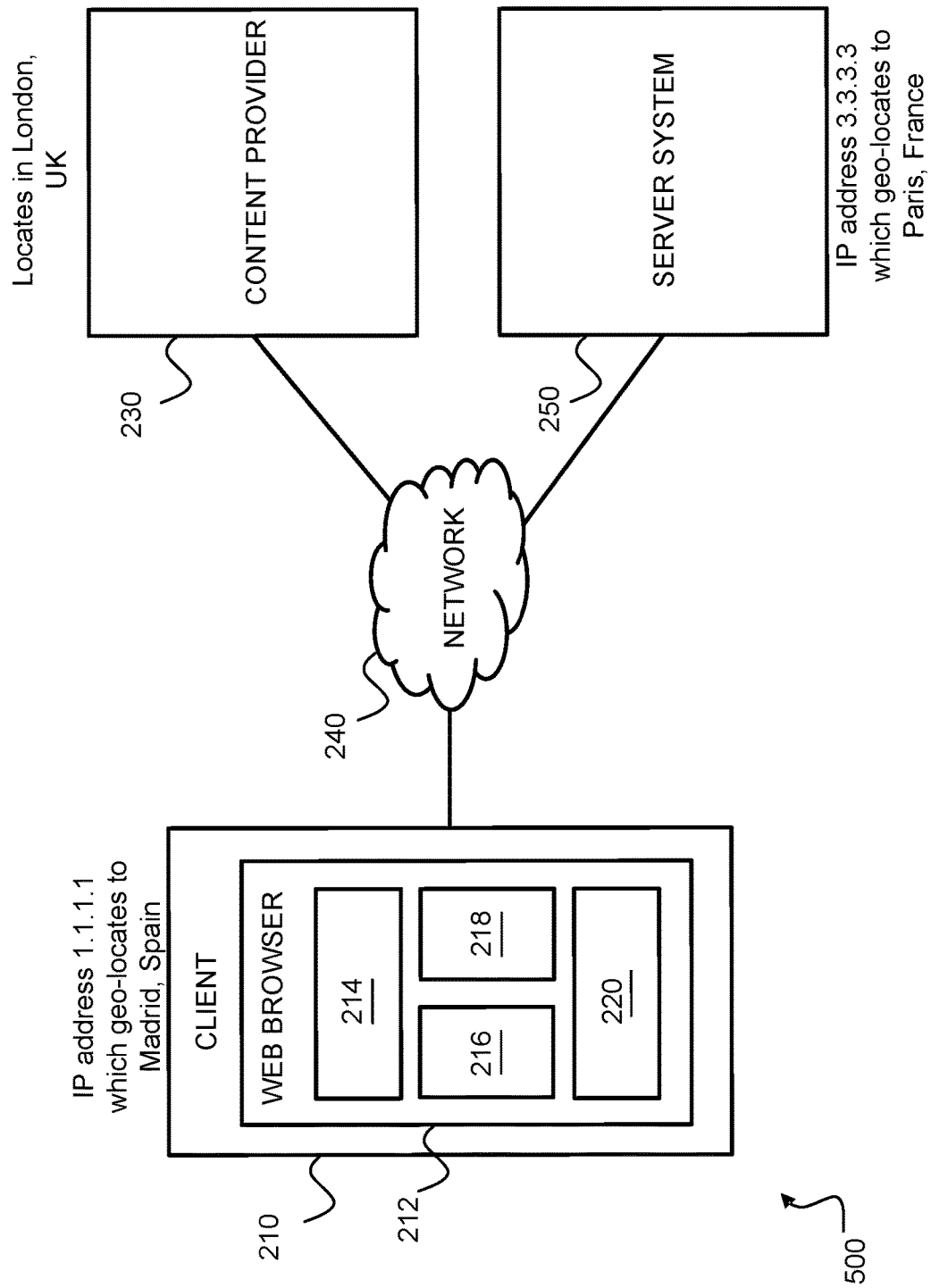
FIG. 5 is a schematic diagram showing an example of a system for controlling rendering of content in a web browser in accordance with an embodiment.

FIG. 5 is a schematic diagram showing an example of a system for controlling rendering of content in a web browser in accordance with an embodiment. The system 500 of FIG. 5 comprises a number of components which are common with the system 200 of FIG. 2 and have been denoted using the same reference numerals. The system 500 of FIG. 5 additionally comprises a server system 250 which acts as a proxy between the client device 210 and the content provider 230 and facilitates one of more countermeasures to protect the integrity of web content delivered from the content provider 230 to the client device 210 over the network 240. That is, the server system 250 is configured to act as an intermediary for requests for webpages originating from the web browser 212 configured on the client device 210. In this respect, the server system 250 may operate transparently (e.g., without requiring any manual configuration by an end user and/or a content origin). In some examples, the server system 250 may comprise a proxy server, a gateway server, an edge server, or any other apparatus suitable for implementing the following techniques.

As described above, in some embodiments, the server system 250 may implement one or more server-side countermeasures to protect the integrity of web content delivered to the web browser 212. For example, the server system 250 may be configured to transform one or more static resource identifiers in a webpage definition 216 to be delivered to the client device 210 to prevent the content modification component 214 and/or network-side content blockers from identifying and blocking requests or rendering of the associated resources. In other words, the server system 250 is configured to transform and encode the one or more static resource identifiers to obfuscate the identity of the associated resources. Once the one or more static resource identifiers have been modified, the server system 250 proceeds to deliver a modified version of the webpage definition 216 comprising the transformed static resource identifiers to the web browser 212 for rendering. In some embodiments, the static resource identifiers have been transformed in a manner that preserves a least a portion of special characters included in the original static resource identifiers in resulting encoded forms of the static resource identifiers. In other words, the server system 250 is configured to transform and encode the one or more dynamic resource identifiers specified in a web content prior to delivery to web browser 212 to obfuscate the identity of the associated resources. For example, certain resource identifiers included in the text of a script have been identified as okay to transform/encode prior to script execution.

As also discussed above, dynamic resource identifiers may be included and/or generated by one or more executable code included or referenced by the webpage definition 216 which are executed by the web browser 212. Accordingly, at least a portion of the dynamic resource identifiers are not available for transformation or are not allowed to be modified (e.g., to ensure correct execution of the dynamically executable code) by the server system 250. Accordingly, the server system 250 may facilitate one of more client-side countermeasures by provisioning the web browser 212 with a component 220 (e.g., virtualization client) that is executable within the web browser 212 to transform one or more dynamic resource identifiers originating from the one or more dynamically executable code specified in or referenced by the webpage definition 216. For example, the component 220 may take the form of one or more scripts that are "injected" into the webpage definition file 216 by the server system 250. In some examples, the component 220 may take the form of one of more scripts written using the JavaScript language. Alternatively, the component 220 may take the form of a code/script that is "pre-delivered" to the web browser prior to delivery of the webpage definition 216 by the server system 250.

In relation to transformations that may have been applied by the server system 250 to static resource identifiers, component 220 is configured to process such transformed static resource identifiers in order to reverse the transformation and recover the original resource identifier. For example, when a resource identifier that identifies a location address pointing to the content provider 230 is transformed/encoded, the resulting encoded resource identifier identifies a location address pointing to server system 250 that will serve as a proxy between the client device 210 and the content provider 230 by fetching the resource of the resource identifier from content provider 230 and delivering it to client device 210. When server system 250 receives a resource request made using an encoded resource identifier, server system 250 decodes the encoded resource identifier back to its original resource identifier and utilizes this original resource identifier to fetch the desired resource and respond to resource request.

According to some embodiments, the component 220 may be configured to control manipulation of the data structure 218 representing the structure of the webpage defined by webpage definition 216. For example, the component 220 may be configured to control access to a DOM tree by intercepting requests to the DOM interface. In effect, the component 220 serves as a virtualization layer to control access to the DOM interface. This virtualization may be facilitated by one or more wrapper methods/functions with respect to one or more of the APIs of the DOM (e.g., Document API interface of a webpage) that replace and wrap corresponding standard API methods/functions of the DOM (e.g., method API calls to create, delete or update elements in the DOM via a Document API interface are replaced with corresponding wrapper methods). For example, particular memory address locations identifying standard code of DOM API (e.g., Document API) methods/calls are in effect replaced with memory address locations of replacement wrapper methods/functions provided via component 220 by replacing standard API JavaScript getter and setter methods of objects of the API with a replacement/wrapper JavaScript getter and setter methods. In some embodiments, DOM core level 1 APIs for manipulating the DOM tree are supplanted by the equivalent interfaces provided via component 220. In this manner, the component 220 is able to intercept requests for resources and modify the requests (e.g., transform/encode resource location identifier (e.g., URL) of a request) in a manner that is transparent to other processes running within the web browser 212 environment. In other words, the component 220 ensures that any other processes running within the web browser only have access to the encoded resource identifiers and thus are unable to determine the original identity (e.g., original location identifier) of resources associated with the webpage. This virtualization of the DOM interface can be used by the component 220 to implement one or more client side optimizations of the webpage and, in particular, one or more client-side countermeasures to protect integrity of the webpage.

According to some embodiments, one optimization enabled by virtualization of the DOM involves encoding of resource identifiers, whereby to cause the web browser 212 to request a resource from a content server other than that from which the resource would be requested without the encoding. For example, rather than request resources from an origin server, resources are requested from a proxy server (e.g., server system 250). Another optimization enabled by virtualization is masking or obfuscation of dynamic resource identifiers. In this manner, the component 220 is able to prevent the content modification component 214 from identifying and blocking or modifying network requests issued by the web browser 212 by masking/obfuscating resource location identifiers of the network requests. For example, the component 220 may utilize one or more API method/function wrappers to intercept a request to add or modify an object stored in the DOM tree, and transform any resource identifiers included in the request to prevent identification of the original location identifier by the content modification component 214.

In some examples, the request to add or modify an object in the DOM tree may originate from one or more executable code in or referenced by the webpage definition 216, which are executed by the web browser 212 and intercepted to invoke the component 220. In this manner, the component 220 is able to transform dynamically generated and utilized resource identifiers before they are added to the DOM tree, thereby circumventing the content modification component 214. In some examples, the one or more executable code which invoke and implement the component 220 may be inserted into the webpage definition 216 by the server system 250 prior to delivering the webpage definition 216 to the client device 210.

The content modification component 214 may monitor and block resource requests before they are issued by the web browser 212. In some embodiments, the component 220 is configured to control access to the API interface to "intercept" resource requests originating from the one or more code instructions such that network requests for resources are not blocked by the content modification component 214. To achieve this, the component 220 may implement one or more wrapper methods/functions with respect to one or more APIs that cause the web browser 212 to issue network requests. For example, the component 220 may implement one or more wrapper methods for the .setAttribute API method to intercept setting of an attribute of a DOM element that identifies a resource identifier and obfuscate the resource identifier before it is added to the DOM and utilized to initiate a network request that can be potentially monitored and blocked by the content modification component 214 based on the resource identifier. In some examples the requests to the API call may originate from a script (e.g., script 306-2) included in the webpage definition 216 and/or a script resource referenced by the webpage definition 216, which, when executed, includes one or more dynamic resource identifiers. Accordingly, in these embodiments, the component 220 is able to obfuscate the dynamic resource identifiers before the original resource identifier is potentially identified and blocked by the content modification component 214.

As described above, one way of achieving resource identifier interception is to override code utilized to access and set/modify resource identifiers during program code execution (e.g., override standard JavaScript getter and setter methods). For example, JavaScript code is utilized access objects of object models that provide a standardized programming interface (e.g., API) to access elements of a web document and a web browser. The object models provide objects with one or more object properties that represent the values and function/methods of the associated object. For example, a web program is able to modify contents to be rendered by calling in program code one or more object properties of an object of a Document Object Model (DOM) API, browser object model API, and/or web API.

In some embodiments, in order to intercept a resource identifier to be obfuscated, some standard web object model object property identifiers (e.g., standard web API object property identifiers) of properties of standard web object model objects are reassigned to invoke inserted wrapper code that replace and in effect wrap corresponding standard web API implementation code. Conventionally, a standard web object model object property identifier (e.g., utilized in web program executed by a browser) of a property of a standard web object model object is assigned by default to reference and invoke standard API (e.g., DOM API, browser object model API, web API, etc.) implementation code. According to embodiments described herein, the standard web object property identifier is reassigned by component 220 to reference and invoke new replacement implementation code, new code is added to encode or decode resource identifiers in addition to invoking the standard API implementation code (e.g., standard API JavaScript getter and setter methods of the property are replaced with a replacement JavaScript getter and setter methods that adds the new code). This in effect replaces particular memory address locations identifying code of a standard API method/functions with replacement memory address locations of replacement methods/functions. Although the standard web object model object property identifier is still utilized in web programs, the standard identifier has been remapped/reassigned to a replacement identifier that identifies the new inserted wrapper code where desired additional processing (e.g., intercept and perform identifier encoding/decoding) is able to be performed in addition to performing the desired standard web API processing (e.g., invoke the standard code of a corresponding web API). In this way, requests for resources are intercepted by the wrapper method/function to modify the requests (e.g., transform/encode resource location identifier (e.g., URL) of a request) in a manner that is transparent to other processes running within web browser 212 environment prior to invoking the standard API to process the request.

Embodiments have particular application in relation to, certain standard web object model object property identifiers (e.g., ".location" property identifier) of properties of standard web object model objects (e.g., "window" object) that are prevented by a web browser from being reassigned to reference and invoke replacement code. Such standard web object model object properties, which implementation code/ function/method is to be executed when its standard object property identifier is referenced in a web program, cannot be modified (e.g., reassignment will cause an error) due to limitations enforced by a web browser. This effectively renders these properties of the standard web object model objects not directly interceptable by setting the standard object property with not configurable and not writable JavaScript object property attributes. This prevents these standard web object model object property identifiers from being reassigned to reference and invoke replacement code to handle resource identifier interception. While it is the case that certain standard web object model object property identifiers of standard object properties can be reassigned to reference and invoke a different replacement code is to redefine/replace the standard API JavaScript getter and setter methods of the standard object property with new code, the browser prevents redefinition/replacement of the getter and setter methods of standard object properties ".location" of a standard web API "window" object".

In some embodiments, one or more instances in program code that references an identifier of a web object model program object property that is prevented by a web browser from being reassigned are identified. For example, JavaScript code of a webpage is analyzed to identify uses of one or more selected program object property identifiers. The one or more identified instances in the program code are modified (e.g., replaced) with one or more corresponding replacement references that include a replacement identifier. The replacement reference is defined in the program code as being associated with a new program object property that invokes the web object model program object property in addition to performing additional processing (e.g., encoding or decoding of a resource identifier) associated with the invocation of the program object property. For example, because the replacement identifier has been utilized instead of the original identifier of the web object model program object property that was prevented by a web browser from being reassigned, the new program object property defined to perform additional processing (e.g., identifier encoding) is invoked in place of the original web object model program object property.

According to some embodiments, the virtualization component 220 may be configured to apply a transformation to resources associated with a webpage, in addition to applying a transformation/encoding to resource identifiers associated with the webpage. For example, the virtualization component may apply a transformation to a resource in order to mask the content of that resource from content modification functionality associated with the web browser 212. Similarly, in some examples, the virtualization component 220 may be configured to transform the content of a resource in response to transforming the content of a resource identifier associated with a different resource. For example, the virtualization component 220 may be configured to apply a transform to content displayed within an HTML iFrame element, in response to a transform being applied to a resource identifier for the iFrame element itself.

According to some embodiments, the web browser 212 may store one or more resources associated with the webpage in a local cache associated with the web browser. For example, the web browser 212 may cache a resource in response to an earlier network request in respect of that resource using a transformed resource identifier. In this example, the web browser 212 may retrieve the cached resource from the cache based on the transformed resource identifier, rather than issuing a network request for the resource to the server system 150 using the transformed resource identifier.

In some embodiments, when web browser 212 requested a webpage, the web browser was provided a modified webpage file of the original webpage. For example, rather than providing the originally requested HTML file of the original requested webpage, the web browser is provided an alternative webpage file of the original webpage that includes component 220. In some embodiments, although certain resource identifiers of the webpage may have been already transformed/encoded prior to delivery to web browser 212, certain resource identifiers may not have been transformed/encoded from their original identifier. For example, dynamically referenced resource identifiers of scripts may not have been transformed prior to delivery. In some embodiments, when an external resource of the webpage is requested via dynamically executed code, component 220 transforms an identifier of the resource to obfuscate the identity of the external resource to prevent content modification component 214 from detecting the identity of the external resource.

In some embodiments, rather than providing the full HTML webpage file of an original requested webpage, the web browser 212 is provided an alternative webpage file of the original webpage that includes component 220 but not the complete contents of the requested webpage (e.g., HTML file) that would have been provided in a traditional response. When web browser 212 attempts to render the alternative webpage file, component 220 is executed. Then component 220 may request and receive contents of the original requested webpage. Because this allows component 220 access the contents of the original requested webpage prior to including it in the DOM for rendering by a web browser, component 220 is able to modify the contents of the original requested webpage, including resource identifier, prior to rendering and detection by content modification component 214.

In some embodiments, rather than requesting a resource of a webpage to be rendered directly from its original content source identified by an original webpage, the request is proxied and/or rerouted via an intermediary such as server system 250. For example, if translated/encrypted resource identifiers are utilized by web browser 212 to make a request for a resource to the original content source (e.g., content provider 230), the request may fail because the original content source does not recognize the transformed/encrypted resource identifier. By routing the request via server system 250, server system 250 translates the transformed resource identifier back to its original identifier and requests as the proxy the requested resource from the content source (e.g., send request to provider 230) using the original identifier. Once server system 250 receives the resource, the resource is provided to the client in response to the request for the resource provided using the transformed resource identifier.

In some embodiments, component 220 may be injected into a webpage based on standards-based (e.g., HTML, JavaScript, ActionScript, etc.) procedures. For example, after server system 250 receives a request from web browser 212 requesting an HTML webpage file, server system 250 injects code implementing component 220 into an alternative HTML webpage file of the requested HTML file, and then sends the response back to web browser 212. In some embodiments, component 220 may be injected into a webpage by a content provider directly. For example, web browser 212 requests an HTML webpage file directly from content provider 230 and content provider 230 provides an alternative webpage file with code of injected component 220. Content provider 230 may be a content producer of the provided content. In some embodiments, component 220 may be injected by adding JavaScript client code in the head section of an alternative HTML webpage file.

Content integrity protection is further described in U.S. patent application Ser. No. 15/405,084 entitled INTERCEPTING NOT DIRECTLY INTERCEPTABLE PROGRAM OBJECT PROPERTY filed Jan. 12, 2017 which is incorporated herein by reference for all purposes.

Another enhancing technique that may be provided by the proxy acceleration network is HTML streaming. The processing time for regenerating a dynamic webpage can be long, leading to long latencies and lowered responsiveness of the website perceived by the user. For example, an origin server may be blocked by database queries to retrieve information required to generate the dynamic webpage. The processing time is dependent on the type or the amount of the information retrieved. For example, the processing time may be minimal for a simple name lookup, but long if a large block of data is fetched. Therefore, the processing time may vary from a few hundred milliseconds to several seconds. During this processing time, the web browser is idling and waiting for the HTTP response to its HTTP request, and the web browser is blocked from downloading any resources. Therefore, improved techniques for delivering information are desirable. The proxy acceleration network disclosed in the present application may provide HTML streaming to speed up the delivery of a dynamic webpage provided by a content provider. Using HTML streaming, a request for a webpage is received, the webpage including one or more dynamic components. A cached stub is sent in response to the request, the cached stub including common components of the webpage that were empirically determined to be common components across multiple requests for the webpage. The request for the webpage is forwarded to an origin server. The webpage is received from the origin server. The difference, if any, between the cached stub and the webpage received from the origin server is determined. If needed, an instruction to correct the difference between the cached stub and the webpage received from the origin server is sent.

HTML streaming is further described in U.S. patent application Ser. No. 14/998,075 entitled HTML STREAMING filed Dec. 23, 2015 which is incorporated herein by reference for all purposes.

Figure 6:
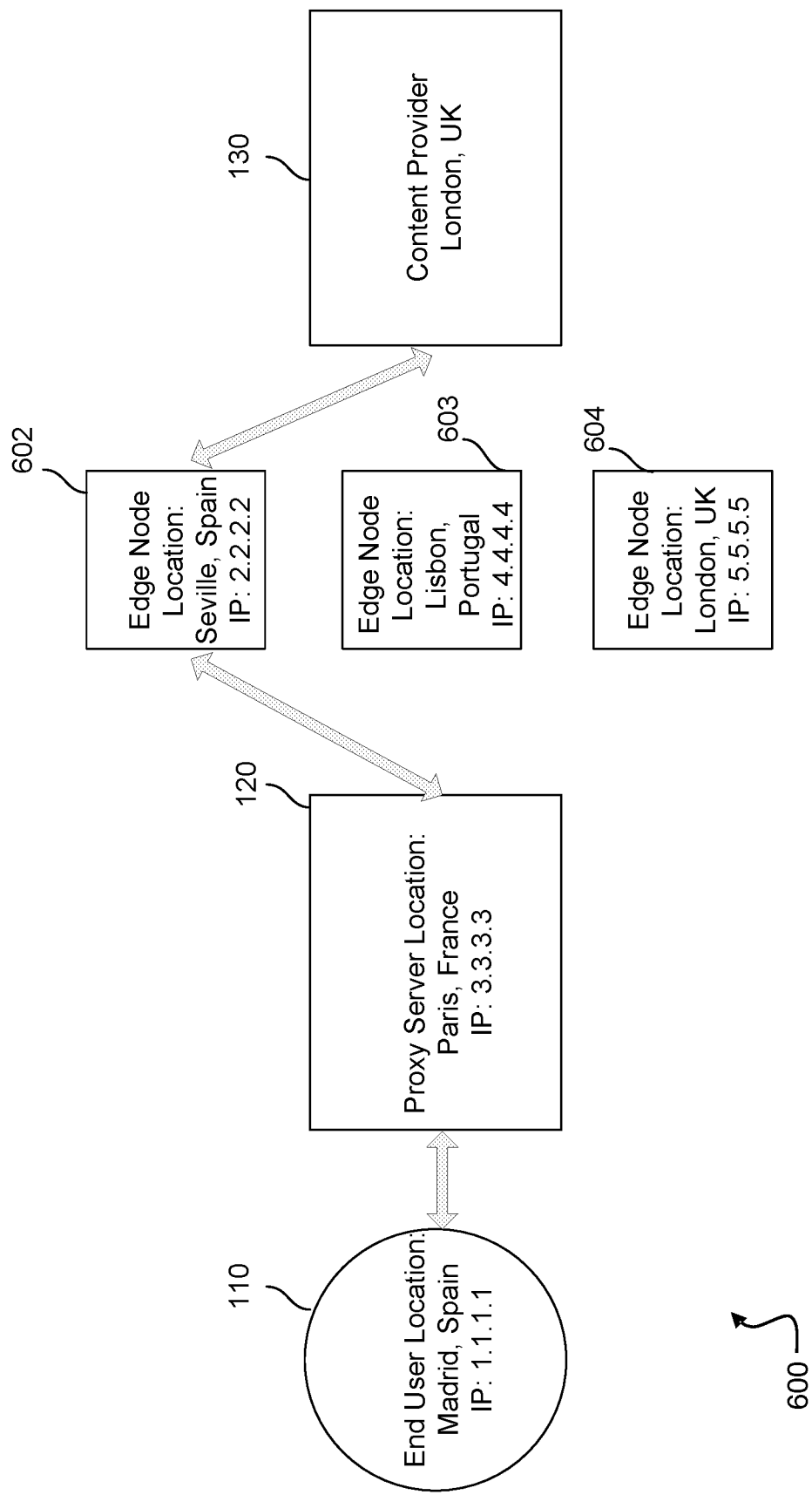
FIG. 6 is a diagram showing an example of delivering location-specific content from a content provider to an end-user via a proxy acceleration network using smart geolocation techniques.

FIG. 6 is a diagram showing an example of delivering location-specific content from a content provider to an end-user via a proxy acceleration network using smart geolocation techniques. The system 600 of FIG. 6 comprises a number of components which are common with the system 100 of FIG. 1 and have been denoted using the same reference numerals. The system 600 of FIG. 6 additionally comprises a number of lightweight edge nodes 602-604, each of which may act as a second proxy between end-user device 110 and content provider 130 and facilitate the delivery of location-specific content from content provider 130 to end-user's device 110.

As shown in FIG. 6, the location of an end-user's device 110 is Madrid, Spain, and its IP address is 1.1.1.1. When the end-user's device 110 sends a request to a content provider 130 requesting for web content to be downloaded to the end-user's device 110, the request is sent to proxy server 120. Proxy server 120 is located in Paris, France, and its IP address is 3.3.3.3. Proxy server 120 extracts the source IP address from the IP header corresponding to the request and uses the extracted source IP address to map to a geolocation by using geolocation software (e.g., MaxMind) or by looking up a geolocation database.

Proxy server 120 then selects one of the lightweight edge nodes (602-604) based on the determined geolocation of end-user's device 110. Because accelerating features such as content integrity protection or HTML streaming can be provided by proxy server 120, the lightweight edge nodes (602-604) do not need to have the computational power, memory size, and functionality to implement such features, and are much less costly to be deployed in many more locations. For example, lightweight edge node 602 is located in Seville, Spain, edge node 603 is located in Lisbon, Portugal, and edge node 604 is located in London, United Kingdom (UK), respectively. In this example, the geolocation of end-user's device 110 is mapped to lightweight edge node 602, which is located in Seville, Spain and has an IP address of 2.2.2.2. The mapping may depend on one or more factors in combination, such as the country, region, or language spoken corresponding to the respective locations of end-user's device 110 and the edge nodes 602-604. In addition, the mapping may also depend on the proximity between the respective locations of end-user's device 110 and the edge nodes 602-604.

Proxy server 120 then forwards the request for web content to the selected lightweight edge node 602. Lightweight edge 602 then further forwards the request for web content to content provider 130 located in London, UK. Because content provider 130 receives the request for web content directly from lightweight edge node 602, content provider 130 may extract the source IP address from the IP header and obtain the source IP address of 2.2.2.2 corresponding to edge node 602. Content provider 130 then uses the extracted source IP address to map to a geolocation in Seville, Spain using geolocation software (e.g., MaxMind) or by looking up a geolocation database. By proxying the traffic through a lightweight edge node with a geolocation that closely represents the geolocation of the originating end-user's device, content provider 130 determines correctly that the content should be personalized for a Spanish user. The personalized location-specific content is then downloaded by content provider 130 via edge node 602 and proxy server 120 to end user's device 110.

There are many advantages of system 600 over system 100 in FIG. 1. System 600 uses one or more proxy servers 120 to provide accelerating features, such as content integrity protection, HTML streaming, or the like. System 600 uses the lightweight edge nodes 602-604 instead to present the proper geolocation information of the end-user's device to content provider 130 by proxying web traffic through them. Content provider 130 therefore is not required to rely on or trust any forwarded insecure client header information which can be easily modified or forged when sent through a proxy delivery network. Furthermore, system 600 allows the proxy acceleration network to consolidate the more expensive proxy and acceleration infrastructure in fewer locations, and only add smaller, lightweight end nodes to cover many geographic regions such that traffic of an end-user can be routed through the one that most closely represents the end-user's geographic location.

Returning to FIG. 5, without using smart geolocation techniques in combination with the acceleration techniques (e.g., HTML streaming) provided by proxy acceleration network 500, when client device 210 sends a request to content provider 230 requesting for web content to be downloaded to client device 210, content provider 230 may see the source IP address of server system 250 but not the source IP address of client device 210, and therefore content provider 230 may serve location-specific content for a location corresponding to server system 250, as opposed to the location corresponding to client device 210.

As shown in FIG. 5, the location of client device 210 is Madrid, Spain, and its IP address is 1.1.1.1. When client device 210 sends a request for web content to be downloaded to client device 110, the request is sent to server system 250. Server system 250 may be a proxy server, a gateway server, or an edge server. Since there are many countries in Europe and it is costly to deploy a server system at a location, server systems are deployed in only some of the countries in Europe. As a result, the closest server system 250 to client device 210 may not be deployed within the same country. For example, server system 250 may be located in Paris, France, and its IP address is 3.3.3.3. Server system 250 then accepts the request and establishes a connection between client device 210 at IP address 1.1.1.1 and itself at IP address 3.3.3.3. Server system 250 then makes a connection to content provider 230 (located in London, UK) to fetch the requested content with a source IP address of 3.3.3.3. Content provider 230 sees the source IP address of 3.3.3.3 corresponding to server system 250 and geolocates the request to Paris, France. Consequently, content provider 230 serves content that is personalized for a French user to client device 210 via server system 250, despite the end-user being based in Madrid, Spain.

Figure 7:
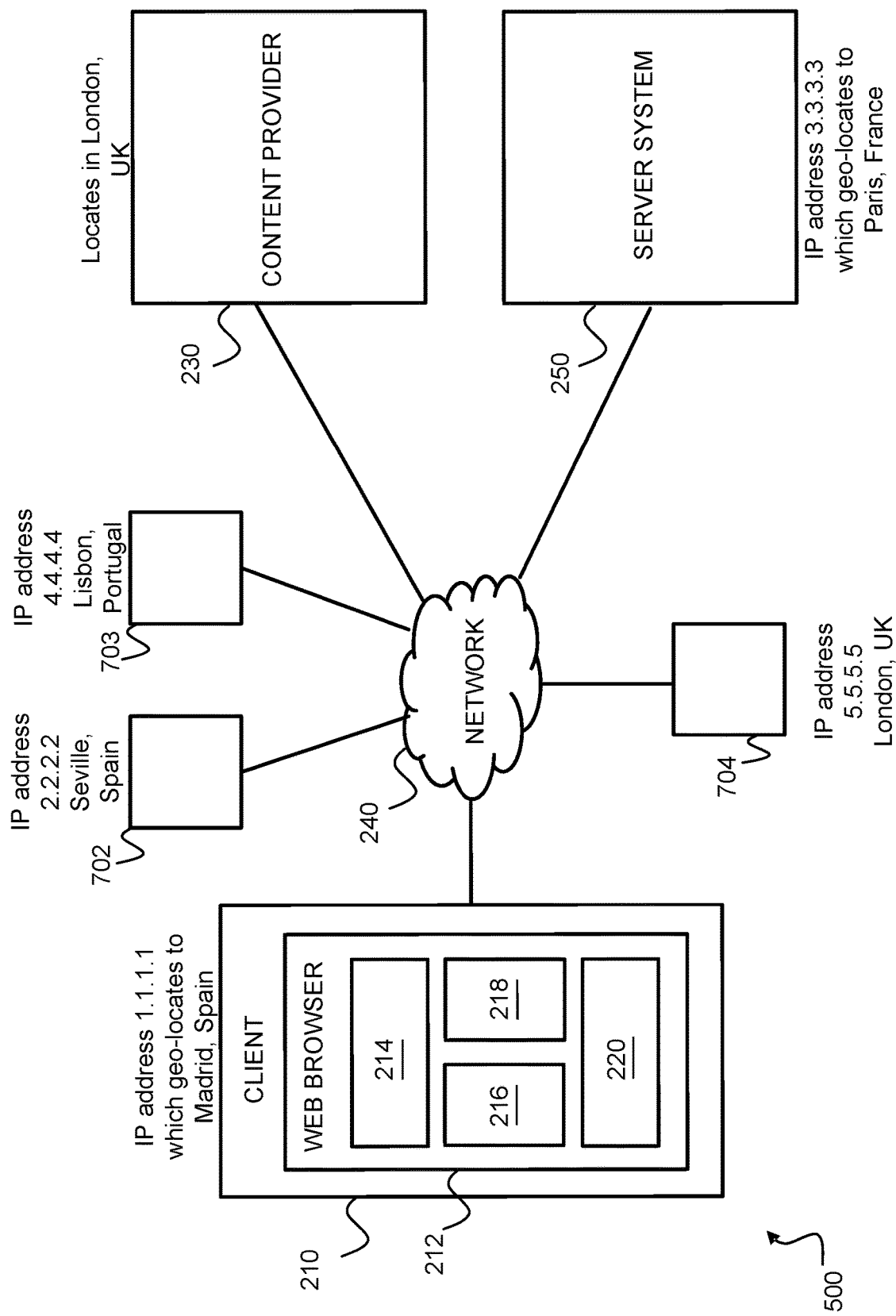
FIG. 7 is a schematic diagram showing an example of a system for delivering location-specific content from a content provider to an end-user via the proxy acceleration network using smart geolocation techniques.

FIG. 7 is a schematic diagram showing an example of a system for delivering location-specific content from a content provider to an end-user via the proxy acceleration network using smart geolocation techniques. The proxy acceleration network 700 of FIG. 7 comprises a number of components which are common with the system 500 of FIG. 5 and have been denoted using the same reference numerals. For example, proxy acceleration network 700 includes server system 250 that can accelerate web traffic by using different enhancing techniques, such as HTML streaming, content integrity protection, and the like. Proxy acceleration network 700 of FIG. 7 additionally comprises a number of lightweight edge nodes 702-704, each of which may act as a second proxy between client device 210 and the content provider 230 and facilitates the delivery of location-specific content from content provider 230 to client device 210. That is, each lightweight edge node may be configured to act as a second intermediary for requests for webpages originating from the web browser 212 configured on the client device 210. In this respect, the lightweight edge node may operate transparently (e.g., without requiring any manual configuration by an end user and/or a content origin). In some examples, a lightweight edge node may comprise a lightweight proxy server, a gateway server, an edge server, or any other apparatus suitable for implementing the smart geolocation techniques.

Figure 8:
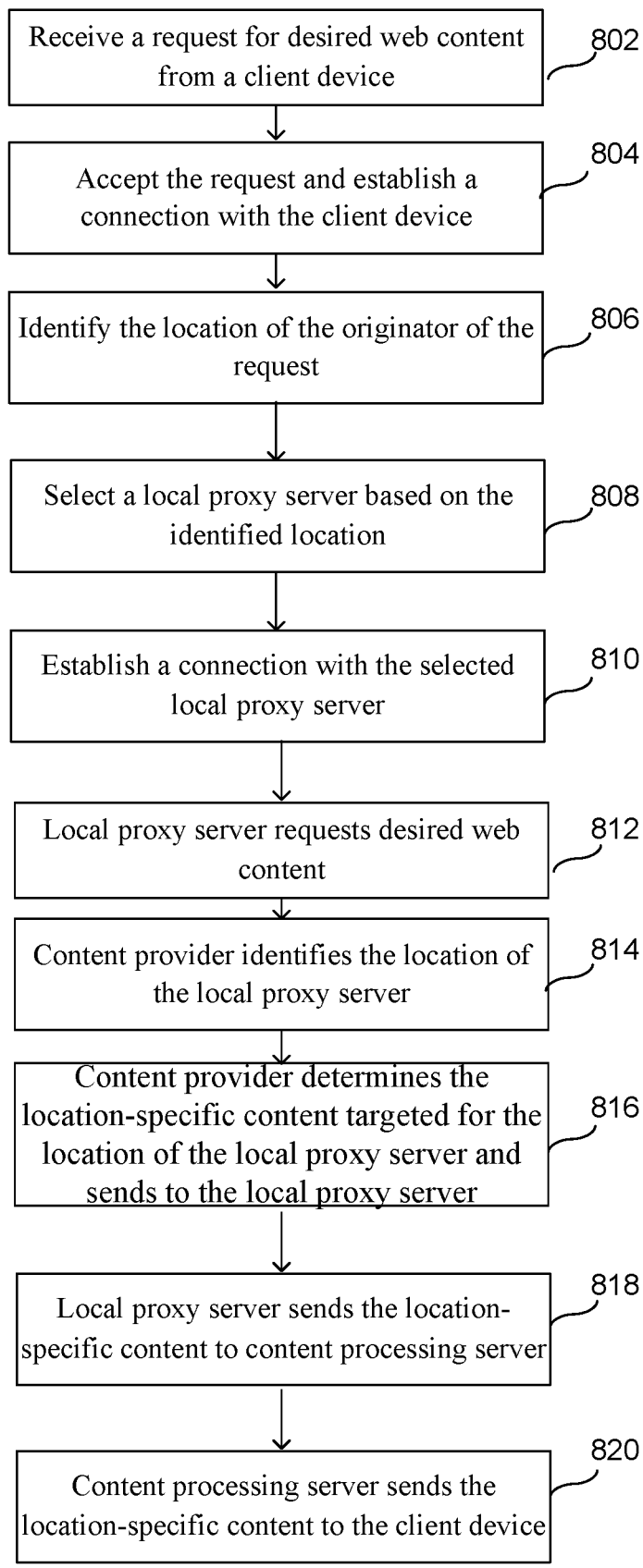
FIG. 8 shows an example of a flow diagram of a process 800 for delivering location-specific content from a content provider to an end-user via a proxy acceleration network using smart geolocation techniques.

FIG. 8 shows an example of a flow diagram of a process 800 for delivering location-specific content from a content provider to an end-user via a proxy acceleration network using smart geolocation techniques. In some embodiments, process 800 may be performed by the proxy acceleration network 700 of FIG. 7.

At 802, desired web content (e.g., webpage definition 216) is requested by a client device. A content processing server receives a request for web content to be downloaded to the originator of the request. For example, web browser 212 sends a request message according to the Hypertext Transfer Protocol (HTTP) or any other suitable networking or Internet protocol to a content processing server (e.g., server system 250), and the request is received by the content processing server. The request should be received by the content processing server directly from the originator of the request. Examples of the web content include a webpage, streaming content, a web application, a web resource, a dynamically executable code resource, a script, a resource of a webpage, and any other content accessible via the Internet. In this example, the location of client device 210 is Madrid, Spain, and its IP address is 1.1.1.1. Server system 250 is located in Paris, France, and its IP address is 3.3.3.3.

At 804, the request for the desired web content sent by a client device is accepted by the content processing server, and a connection is established between the client device and the content processing server. In particular, a connection is established between client device 210 at IP address 1.1.1.1 and server system 250 at IP address 3.3.3.3.

At 806, a location of the originator of the request is identified. For example, server system 250 may extract the source IP address 1.1.1.1 from an IP header corresponding to the received request and use the extracted source IP address 1.1.1.1 to map to a geolocation. In this example, the geolocation is mapped to Madrid, Spain. The mapping from the extracted source IP address to a geolocation can be performed using different geo-IP techniques, such as using geolocation software (e.g., MaxMind) or looking up a geolocation database. It should be recognized that since the request for the web content is received by the content processing server directly from the originator of the request at step 802, the source IP address cannot be forged by another party and therefore can be used to reliably identify the location of the originator of the request.

At 808, a local proxy server is selected based on the identified location of the originator of the request. The local proxy server is selected from a plurality of lightweight edge nodes that are deployed in possibly many different geographical areas serviced by proxy acceleration network 700. In this example, lightweight edge node 702 is located in Seville, Spain, edge node 703 is located in Lisbon, Portugal, and edge node 704 is located in London, United Kingdom (UK), respectively. In this example, the geolocation of client device 210 is mapped to lightweight edge node 702, which is located in Seville, Spain and has an IP address of 2.2.2.2. In this example, only three lightweight edge nodes are shown; however, one skilled in the art should be able to understand that many more lightweight edge nodes may be deployed. Because accelerating features such as content integrity protection or HTML streaming can be provided by server system 250 (also referred to as an Instart proxy server), the lightweight edge nodes 702-704 (also referred to as Instart Exit Nodes) do not need to have the computational power, memory size, and functionality to implement such features, and are much less costly to be deployed in many more locations. Therefore, in some embodiments, there may be more lightweight edge nodes than server systems deployed in proxy acceleration network 700. However, it should be recognized that multiple server systems may select a particular lightweight edge node as a local proxy server for proxing requests for web content, and a server system may select from a plurality of lightweight nodes. The number and the geographical locations of the lightweight edge nodes may be determined based on many factors, including the distribution and number of the client devices, the amount of traffic being proxied through the lightweight edge nodes, cost of deploying the nodes, and the like. In some embodiments, one or more lightweight edge nodes are deployed in each country. In some embodiments, some countries do not have any lightweight edge nodes deployed within but have lightweight edge nodes deployed in neighboring or nearby countries.

The local proxy server selected at step 808 should be selected such that the correct location-specific content targeted for the originating client device 210 is served by content provider 230 in response. The local proxy server should be selected such that it appears to content provider 230 as if the request was originating from a location that should be served the same location-specific content as that of the location of originating client device 210. Since the content provider may determine the location of the local proxy server based on the IP address of the local proxy server, the selected local proxy server should have a geolocation based on geo-IP techniques that shares the same location-specific content targeted for the geolocation of the originating client device.

Determining whether the geolocation of the selected local proxy server shares the same location-specific content targeted for the geolocation of the originating client device may be performed by using lookup tables or by searching a database.

In some embodiments, the determining of whether the geolocation of the selected local proxy server shares the same location-specific content targeted for the geolocation of the originating client device may be based on the granularity, in terms of geographical locations, of the location-specific content served by content provider. If the content served by content provider 230 is specific to each country, then any one of the local proxy servers within the same country as that of the originating client device 210 may be selected; and other factors may be used to decide which local proxy server within that country should be selected. However, if the content served by content provider 230 is specific to each of many sub-regions within a country, then a local proxy server within the same sub-region within the country as that of the originating client device 210 is selected. In yet another example, if the content served by content provider 230 is identical across multiple countries with a region (i.e., the content is specific to a multi-country region), then a local proxy server within one of the multiple countries within the multi-country region may be selected. Therefore, the selecting of the local proxy server at step 808 is based on the granularity in terms of geographical locations of the location-specific content served by content provider 230.

In some embodiments, the determining of whether the geolocation of the selected local proxy server shares the same location-specific content targeted for the geolocation of the originating client device may also be based on the granularity of the geolocation software or geolocation database. For example, if the geolocation software has a granularity such that an IP address may be mapped to a specific country but not a specific sub-region within a country, then a local proxy server within the same country as that of the originating client device 210 may be selected.

The mapping may further depend on one or more factors in combination. In some embodiments, one of the factors may include the languages spoken in the respective locations of client device 210 and the plurality of lightweight edge nodes 702-704. In addition, the mapping may also depend on the proximity between the respective locations of client device 210 and the lightweight edge nodes 702-704. For example, suppose that multiple edge nodes, if selected at step 808, would have caused the same correct location-specific content targeted for the originating client device 210 to be served by content provider 230. Then the edge node among these multiple qualified edge nodes that is physically closest to client device 210 may be selected. In some embodiments, the edge node among multiple qualified edge nodes that minimizes the total distance from client device 210 to server system 250, from the server system to the selected edge node, and from the selected edge node to content provider 230 may be selected. In some embodiments, the edge node among multiple qualified edge nodes that minimizes the web traffic round-trip time from client device 210 to server system 250, from server system to the selected edge node, and from the selected edge node to content provider 230 may be selected.

At 810, a connection is established between server system 250 and the local proxy server selected at step 808. In this example, a connection is established between server system 250 at IP address 3.3.3.3 and lightweight edge node 702 in Seville, Spain and having an IP address of 2.2.2.2.

At 812, the desired web content is requested by the selected local proxy server. Content provider 230 receives the request for web content directly from the selected local proxy server. In this example, edge node 702, acting as a proxy, sends the request for web content to content provider 230. In some embodiments, the sending of the request is triggered by the connection established at step 810. In some embodiments, the sending of the request is triggered by an indication sent to the selected local proxy server by the content processing server.

At 814, a location of the local proxy server is identified by the content provider. For example, content provider 230 may extract the source IP address 2.2.2.2 from an IP header corresponding to the request received from the local proxy server and use the extracted source IP address 2.2.2.2 to map to a geolocation. In this example, the geolocation is mapped to Seville, Spain. The mapping from the extracted source IP address to a geolocation can be performed using different geo-IP techniques, such as using geolocation software (e.g., MaxMind) or looking up a geolocation database. It should be recognized that since the request for the web content is received by content provider 230 directly from the local proxy server at step 812, the source IP address cannot be forged by another party and therefore can be used to reliably identify the location of the local proxy server.

At 816, location-specific content targeted for the location of the local proxy server is determined based on the location identified at step 814. The determined location-specific content is then sent to the local proxy server. The determined location-specific content should be identical to the location-specific content targeted for the location of the originating client device 210. In this example, by proxying the request through a lightweight edge node with a geolocation that closely represents the geolocation of the originating client device, content provider 230 determines correctly that the content should be personalized for a Spanish user.

The location-specific content is then proxied back through the edge node 702 and server system 250 to client device 210. At 818, the personalized location-specific content is sent by edge node 702 to server system 250. At 820, the personalized location-specific content is then sent by server system 250 to client device 210.

In some embodiments, before the location-specific content is sent by server system 250 to client device 210 at step 820, server system 250 employs different enhancing techniques to accelerate the delivery of the location-specific content to client device 210. The enhancing techniques may include content integrity protection, HTML streaming, and the like.

In some embodiments, the location-specific content sent by edge node 702 to server system 250 is cached by server system 250 for other originators of request for web content. In some embodiments, the cached content is stored in a database with metadata that may be used to determine whether the stored location-specific content is shared by a subsequent originator of request for web content. The metadata may include the source IP address corresponding to the stored location-specific content, the geolocation identified based on that source IP address, the local proxy server that proxied the location-specific content, and the like.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering location-specific content, comprising:
   receiving a request for content at a first server, the request having a request header that includes potentially insecure information;
   the first server identifying a location of an originator of the received request for content;
   the first server selecting from a set of second servers a given second server based on the identified location of the originator of the received request for content, wherein as between the first server and the given second server, the first server has more processing or storage capability;
   proxying the request for content to an origin via the selected given second server;
   receiving at the first server location-specific content, the location-specific content having been generated at the origin without reliance on the potentially insecure information; and
   sending to the originator of the received request the received location-specific content in response to the received request, the received location-specific content being provided by the first server in accordance with at least an acceleration feature.

2. The method as described in claim 1 wherein the content is web content.

3. The method as described in claim 1 further including:
   extracting a source Internet Protocol (IP) address corresponding to the received request for content; and
   identifying the location of the originator of the received request for content based on the extracted source IP address.

4. The method as described in claim 1, wherein selecting the given second server based on the identified location of the originator further includes determining that a location of the given second server also shares location-specific content served by the origin.

5. The method as described in claim 1, wherein at least one of the first server and the given second server comprise a proxy server.

* * * * *